(12) United States Patent
Yamka et al.

(10) Patent No.: US 8,906,434 B2
(45) Date of Patent: Dec. 9, 2014

(54) COMPOSITIONS AND METHODS FOR REDUCING STOOL VOLUME AND STOOL ODOR

(75) Inventors: Ryan Michael Yamka, Topeka, KS (US); Kim Gene Friesen, Auburn, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 652 days.

(21) Appl. No.: 11/774,863

(22) Filed: Jul. 9, 2007

(65) Prior Publication Data

US 2011/0123669 A1    May 26, 2011

(51) Int. Cl.

| | | |
|---|---|---|
| *A23K 1/18* | (2006.01) | |
| *A23K 1/00* | (2006.01) | |
| *A23D 7/00* | (2006.01) | |
| *A23D 9/00* | (2006.01) | |
| *A23L 1/30* | (2006.01) | |
| *A23B 4/00* | (2006.01) | |
| *A23L 1/31* | (2006.01) | |
| *A23L 1/315* | (2006.01) | |
| *A23B 4/023* | (2006.01) | |
| *A23K 1/17* | (2006.01) | |
| *A23K 1/165* | (2006.01) | |
| *A23K 1/16* | (2006.01) | |
| *A23K 1/14* | (2006.01) | |
| *A23K 1/02* | (2006.01) | |
| *A23L 1/00* | (2006.01) | |
| *A23D 9/013* | (2006.01) | |
| *A23D 9/007* | (2006.01) | |

(52) U.S. Cl.
CPC ............. *A23K 1/1846* (2013.01); *A23K 1/1634* (2013.01); *A23K 1/146* (2013.01); *A23K 1/14* (2013.01); *A23D 9/00* (2013.01); *A23K 1/02* (2013.01); *A23K 1/164* (2013.01); *A23K 1/1643* (2013.01); *A23L 1/3006* (2013.01); *A23K 1/003* (2013.01); *A23K 1/1853* (2013.01); *A23L 1/005* (2013.01); *A23L 1/3103* (2013.01); *A23G 2200/08* (2013.01); *A23D 9/013* (2013.01); *A23K 1/1813* (2013.01); *A23K 1/1631* (2013.01); *A23K 1/1826* (2013.01); *A23D 9/007* (2013.01)
USPC ............... 426/2; 426/623; 426/601; 426/72; 426/635; 426/92

(58) Field of Classification Search
CPC . A23K 1/1813; A23K 1/1643; A23K 1/1631; A23K 1/1846; A23K 1/164; A23K 1/1826; A23K 1/003; A23K 1/02; A23K 1/146; A23D 9/00; A23D 9/007; A23D 9/013
USPC .............................................. 426/2, 623, 635
See application file for complete search history.

(56) References Cited

U.S. PATENT DOCUMENTS

| | | | |
|---|---|---|---|
| 6,204,291 B1 * | 3/2001 | Sunvold et al. | 514/556 |
| 6,517,877 B2 | 2/2003 | Gannon | |
| 6,899,904 B2 | 5/2005 | Lin et al. | |
| 2003/0138547 A1 | 7/2003 | Bui et al. | |
| 2003/0194478 A1 * | 10/2003 | Davenport et al. | 426/601 |
| 2003/0228349 A1 | 12/2003 | Singh et al. | |
| 2004/0044079 A1 * | 3/2004 | Sunvold et al. | 514/560 |
| 2005/0112179 A1 | 5/2005 | Khoo | |
| 2005/0112217 A1 | 5/2005 | Khoo | |
| 2007/0128310 A1 | 6/2007 | Honda et al. | |

FOREIGN PATENT DOCUMENTS

| | | |
|---|---|---|
| CN | 1886061 A | 12/2006 |
| GB | 2 303 043 A1 | 2/1997 |
| GB | 2303043 | 2/1997 |
| JP | H07-313071 | 12/1995 |
| JP | 2003-210115 A | 7/2003 |
| WO | WO2004/045300 | 6/2004 |
| WO | WO2005/053426 | 6/2005 |
| WO | WO2005/053427 | 6/2005 |
| WO | WO2005/058064 | 6/2005 |
| WO | 20070056686 A1 | 5/2007 |
| WO | WO2007/056686 | 5/2007 |

OTHER PUBLICATIONS

Premium Pet Food Purina One. Available online at www.purinaone. com since Mar. 31, 2002.*

Johnson, R.A. "Pet Food Market and Technology," Conference on Biotechnology in the Feed Industry (1990) Proceedings of Alltech pp. 167-181 XP000670865.

"Growth Accelerators of animals which help reduce faecal odour—comprising extracts of Eucalyptus Plants" Derwent, (1994) XP002210414.

International Search Report and Written Opinion for International Application No. PCT/US07/073027 mailed on. Jan. 15, 2009.

Ling, "Study of Nutrition and Diet for Dogs (Lecture 1)" Science and Technology of Sichuan Grain and Oil 3:1-11 (1998).

Sato, et al., "Analysis of malodorous volatile substances of human waste: feces and urine." Journal of Health Science 47: 483-490 (2001).

Sutton, et al, "Potential for reduction of odorous compounds in swine manure through diet modification" J. Animal Science 77:430-439 (1999).

Yamka, et al. "In vivo measurement of flatulence and nutrient digestibility in dogs fed poultry by-product meal, conventional soybean meal, and low-oligosaccharide low-phytate soybean meal" Am. J. Vet. Res. 67:88-94 (2006).

* cited by examiner

*Primary Examiner* — Rena L Dye
*Assistant Examiner* — Assaf Zilbering
(74) *Attorney, Agent, or Firm* — Thomas M. Hunter

(57) ABSTRACT

The present invention provides animal food compositions comprising high quality proteins and highly digestible carbohydrates which result in reduced stool production and stool odor upon ingestion by an animal, and methods for use.

26 Claims, No Drawings

COMPOSITIONS AND METHODS FOR REDUCING STOOL VOLUME AND STOOL ODOR

The present invention relates to highly digestible pet food compositions comprising high quality protein and highly digestible carbohydrates and methods for reducing pet stool volume and pet stool odor by feeding an animal a composition of the present invention.

BACKGROUND OF THE INVENTION

Pets produce stool, and defecation may occur in any number of places, e.g., outdoors, in litter boxes, or on newspaper. Cleaning up pet feces is often unpleasant, and although many products are marketed to make this task as pleasant as possible, the products fail to address the underlying problem of stool production, volume of stool produced, and unpleasant odors associated with stool. It is commonly known that food compositions can have a great impact on the amount of and characteristics of stool produced by an animal. Thus, it would be desirable to develop compositions and methods to reduce stool produced by an animal, either by weight or volume, and to reduce stool odor.

SUMMARY OF THE INVENTION

The present invention relates to a highly digestible pet food composition which comprises high quality protein and highly digestible carbohydrates, the ingestion of which causes the formation of animal stools which are smaller in volume and have less unpleasant odor compared to stools produced by an animal fed compositions which contain lower quantities of high quality proteins and less digestible carbohydrates. Thus, in one aspect, the invention relates to a pet food composition comprising one or more high quality proteins, and one or more highly digestible carbohydrates. In certain embodiments, the compositions may include from about 15% to about 30% high quality protein and from about 25% to about 50% highly digestible carbohydrate. Said high quality protein may have a true protein digestibility of greater than about 90%, 91%, 92%, 93%, 94%, or 95%; said highly digestible carbohydrate may have a digestibility of greater than about 90%, 92%, 94%, 95%, or 96%. The compositions of the present invention may have greater than about 88%, 90%, or 95% dry matter digestibility. In a particular embodiment, a composition of the present invention is a nutritionally complete pet food, more particularly, a dog food.

In a particular embodiment, the invention is directed to a composition comprising: 36% brewers rice, 16% egg, 16% corn starch, 14.5% corn gluten meal, 2.5% beet pulp, 2.5% soybean oil, 2% flaxseed, carnitine, one or more amino acids, minerals and vitamins. Specifically, said composition displays ≥88.0% dry matter, true protein, fat, carbohydrate, and energy digestibility.

In another aspect, the invention is directed to methods for reducing the volume of stool produced by an animal comprising feeding the animal any one of the highly digestible compositions of the present invention.

In a further aspect, the invention is directed to methods for reducing the odor of stool produced by an animal comprising feeding the animal any of one of the highly digestible compositions of the present invention.

In an additional aspect, the invention is directed to the use of high quality proteins and highly digestible carbohydrates in the manufacture of a food composition to feed to an animal in order to reduce the volume of stool produced by the animal.

In a further aspect, the invention is directed to the use of high quality proteins and highly digestible carbohydrates in the manufacture of a food composition to feed to an animal in order to reduce the odor of stool produced by the animal.

Other embodiments of the present invention will be apparent to those of skill in the art.

DETAILED DESCRIPTION OF THE INVENTION

Without being limited to any theories or particular modes of action of the invention, the present invention is based on the discovery that certain compositions, when ingested by an animal, can result in less stool production and the stool produced has a reduced odor. Generally, the compositions are highly digestible, comprising one or more high quality proteins and highly digestible carbohydrates. The increase in digestibility results in lower stool volume produced. In addition, it is believed that the reduction in stool odor is due to the increase in digestibility and associated reduction in the amount of sulfur containing compounds in the stool produced by an animal ingesting the compositions of the present invention.

As used herein and in the appended claims, the singular forms "a", "an", and "the" include plural reference unless the context clearly dictates otherwise.

As used herein, "an amount effective", "an effective amount", and like terms refer to that amount of a compound, material or composition as described herein that may be effective to achieve a particular biological result, e.g., to reduce stool volume and to reduce stool odor. Such result may be achieved, for example, by administration of the compositions of the present invention to an animal. An effective amount may be based on several factors, including the particular animal, sex, age, weight, and/or the metabolizable energy of the composition. As contemplated herein, the daily amount of the food compositions to be fed to an animal are familiar to one of skill in the art.

As used herein, a "highly digestible diet" refers to a diet that has a digestibility of greater than or equal to 88.0%. The term "nutrient digestibility" includes the digestibility of dry matter, protein, fat, carbohydrate and energy.

The present invention relates to any animal, preferably a mammal, more preferably a companion animal, which may benefit from feeding the formulations disclosed herein. The term "companion animal" refers to any animal that lives in close association with humans and includes, but is not limited to, pet canines and felines of any breed. For example, it is contemplated herein that this term may also encompass any animal whose diet may be controlled by humans and which may benefit from feeding the formulations disclosed herein. These animals may include, e.g., domesticated farm animals (e.g. cattle, horses, swine, etc.) as well as undomesticated animals held in captivity, e.g. in zoological parks and the like.

The present invention may be suitable for use with animals in various stages in life, including lactation, weaning, growth, adult, senior, and geriatric. Preferably, the animal is an adult, senior, or geriatric animal, preferably an adult animal.

Except to the extent stated otherwise, all percentages used in this specification are weight percentages on a dry matter basis. The phrase "dry matter basis" means the component concentration in the composition after any moisture in the composition is removed.

As referred to herein, a "high quality protein" is any protein or mixture of proteins that may be digested by a "true protein digestibility" (as opposed to "apparent protein digestibility") to greater than about 90%, preferably greater than about 95%, more preferably greater than about 98%.

Methods for determining the digestibility of proteins are known by those of skill in the art. For example, protein content of compositions may be determined by any number of methods known by those of skill in the art, for example, as published by the Association of Official Analytical Chemists in *Official Methods of Analysis* ("OMA"), method 988.05. Thus, in order to determine "apparent protein digestibility", one of skill in the art would determine the protein content of a composition and the protein content of stool produced by feeding the animal the composition. The apparent protein digestibility is then calculated as follows:

$$\frac{(\text{amount of protein consumed} - \text{protein content of stool})}{\text{amount of protein consumed}} \times 100\%.$$

It is known that stool contains many other protein sources, e.g., bacterial proteins, enzymes produced by the digestion process, and bile. Thus, protein digestibility may be skewed by the presence of endogenous proteins in the stool. Thus, the apparent protein digestibility is often multiplied by a factor to take into account the presence of such endogenous proteins to determine a true protein digestibility percentage. Depending on the amount of endogenous proteins present, the factor may be increased or decreased. In the present invention, the true protein digestibility is determined by multiplying the protein digestibility by a factor of 1.051. That is, the difference between true protein digestibility and apparent protein digestibility is 1.051 such that, e.g., an apparent protein digestibility of 88.5% would equate to 93.0% true protein digestibility.

Sources of high quality protein for use in the present invention include plant sources, animal sources, or both. Animal sources include, for example, meat, meat by-products, seafood, dairy products (including powdered milk), and egg. Vegetable sources may include soy protein isolate. High quality proteins can be intact, almost completely hydrolyzed, partially hydrolyzed proteins, or isolates. Preferably, the high quality protein is egg, e.g., chicken egg, substantially free of shells. Other sources of high quality protein include egg white, casein, hydrolyzed vegetable protein, whey protein, ovalbumin, and lactalbumin. As contemplated herein, the compositions of the present invention may include any mixture of high quality proteins. Compositions of the present invention may comprise from about 15-30% of high quality protein.

As referred to herein, "highly digestible carbohydrates" are those carbohydrates that may be digested by an animal, e.g., a canine, to greater than about 90%, greater than about 93%, preferably greater than about 95%, or greater than about 96%. Highly digestible carbohydrates may be supplied by any of a variety of sources known by those skilled in the art, including corn, wheat, rice (e.g. brewer's rice), starch (e.g., rice and corn starch), corn gluten meal, and distiller's dried grain. As contemplated herein, the compositions of the present invention may include any mixture of highly digestible carbohydrates. Compositions of the present invention may comprise from about 25-50% of highly digestible carbohydrates.

Methods for determining the digestibility of carbohydrates are known by those of skill in the art. Carbohydrate percentage may be calculated as nitrogen free extract ("NFE"), which may be calculated as follows: NFE=100%−moisture %−protein %−fat %−ash %−crude fiber %. Thus, in order to determine the carbohydrate digestibility, one of skill in the art would determine the carbohydrate content of a composition, and the carbohydrate content of stool produced by feeding the animal the composition. The carbohydrate digestibility is then calculated by the following equation:

$$\frac{(\text{amount of carbohydrate consumed} - \text{carbohydrate content of stool})}{\text{amount of carbohydrate consumed}} \times 100\%$$

Dry matter digestibility (DMD) is the amount of matter that is digested by an animal on a dry matter basis. In general, digestibility is determined by measuring the content ingested minus the content in the feces divided by the content ingested. Methods for determining DMD are known in the art. For example, the mass of food consumed on a dry matter basis is determined, and the mass of stool (on a dry matter basis) resulting from consumption of the food is also determined. DMD is then calculated as follows:

$$\frac{(\text{mass of food consumed} - \text{mass of stool produced})}{\text{mass of food consumed}} \times 100\%$$

Fat and energy digestibility may also be determined as provided above, e.g., $$\frac{(\text{amount of fat consumed} - \text{fat content of stool})}{\text{amount of fat consumed}} \times 100\%;$$

$$\frac{(\text{amount of energy consumed} - \text{energy content of stool})}{\text{amount of energy consumed}} \times 100\%$$

Determination of fat and energy content in food and stool may be performed according to conventional methods familiar to one of skill in the art.

In addition to causing a reduction in stool volume, the compositions of the present invention cause the stool produced by an animal ingesting said compositions to be reduced in odor. Methods for assaying the odor of stool are familiar to one of skill in the art. For example, qualitative assessment using human panelists such as described in the Examples provided herein may be used to rank stool odor. In addition, quantitative measurement of stool odor compounds using, e.g., gas chromatography and mass spectrometry may be used. Stool odor compounds quantitatively assayed in excreta include sulfur containing compounds, phenols, heterocycles and indoles, carboxylic acid compounds, and ketone compounds.

As contemplated herein, the compositions of the present invention are meant to encompass nutritionally complete pet food diets. A "nutritionally complete diet" is a diet that includes sufficient nutrients for maintenance of normal health of an intended recipient animal on the diet (e.g., domestic feline or domestic canine) and is familiar to one of skill in the art. For example, nutrients and ingredients such as those disclosed herein as well as others suitable for animal feed compositions, and recommended amounts thereof, may be found, for example, in the Official Publication of the Associate of American Feed Control Officials Inc., ("AAFCO"), *Nutrient Requirements of Dogs and Cats,* 2006.

The nutritionally complete pet food compositions disclosed herein may comprise fat. Sources of fat for the compositions of the present invention can be supplied by any of a variety of sources known by those skilled in the art, including meat, meat by-products, fish oil, and plants. Plant fat sources include wheat, flaxseed, rye, barley, rice, sorghum, corn, oats, millet, wheat germ, corn germ, soybeans, peanuts, and cottonseed, as well as oils derived from these and other plant fat sources. As contemplated herein, the compositions of the present invention may comprise from about 11% to 16% fat, preferably about 14% fat.

Vitamins and minerals may also be included in the compositions described in the instant invention in amounts known to those of skill in the art to avoid deficiency and maintain health. For example, the National Research Council (NRC) provides recommended amounts of such ingredients for farm animals, and AAFCO (e.g., Official Publication of the Associate of American Feed Control Officials Inc., ("AAFCO"), *Nutrient Requirements of Dogs and Cats,* 2006) provides recommended amounts of such ingredients for canines and felines. Vitamins may include vitamin A, vitamin $B_1$, vitamin $B_2$, vitamin $B_6$, vitamin $B_{12}$, vitamin C, vitamin D, vitamin E, vitamin H (biotin), vitamin K, folic acid, inositol, niacin, and pantothenic acid. Examples of minerals include e.g., calcium, phosphorus, dicalcium phosphate, potassium citrate, potassium chloride, calcium carbonate, sodium chloride, or salts of sodium, potassium, magnesium, manganese, calcium, chloride, copper, zinc, choline, phosphorus, iodine or selenium.

Fiber, including but not limited to dietary fiber, may be included in the compositions of the present invention. Dietary fiber refers to components of a plant that are resistant to digestion by an animal's digestive enzymes. Dietary fiber components of foods may be determined by any number of methods known by those of skill in the art, such as OMA method 991.43/32.1.17 (1994). Total dietary fiber includes soluble and insoluble fibers. Soluble fiber is resistant to digestion and absorption in the small intestine, but undergoes complete or partial fermentation in the large intestine. Sources of soluble fiber for use in the compositions disclosed herein include, e.g., beet pulp, guar gum, chicory root, psyllium, pectin, blueberry, cranberry, squash, apples, oats, beans, citrus, barley, or peas. Insoluble fibers are fibers that do not dissolve in water and tend to increase the rate at which food passes through the digestive tract. Examples include, but are not limited to, cellulose, whole wheat products, wheat oat, corn bran, flax seed, grapes, celery, green beans, cauliflower, potato skins, fruit skins, vegetable skins, peanut hulls, and soy fiber. As contemplated herein, the compositions of the present invention may comprise from about 3% to 6% total dietary fiber.

The compositions of the present invention may additionally comprise amino acids in amounts known to those of skill in the art to avoid deficiency and maintain health. Preferably, the compositions of the present invention comprise "essential amino acids." Essential amino acids are amino acids that cannot be synthesized de novo, or in sufficient quantities by an organism and thus must be supplied in the diet. Essential amino acids vary from species to species, depending upon the organism's metabolism. For example, it is generally understood that the essential amino acids for dogs and cats (and humans) are phenylalanine, leucine, methionine, lysine, isoleucine, valine, threonine, tryptophan, histidine and arginine. In addition, taurine, while technically not an amino acid but a derivative of cysteine, is an essential nutrient for cats and dogs.

The compositions of the present invention may additionally comprise nutritional supplements, e.g., carnitine and omega-3 or omega-6 fatty acids, in amounts known to those of skill in the art to avoid deficiency and maintain health. Carnitine, or L-carnitine, is a vitamin-like compound synthesized in the body from lysine and methionine. Carnitine may be naturally present in the ingredients of the present invention (e.g., flaxseed), or carnitine may be added to the compositions.

The compositions of the present invention may additionally comprise additives, stabilizers, fillers, thickeners, flavorants, palatability enhancers and colorants in amounts and combinations familiar to one of skill in the art. Stabilizing substances may increase the shelf life of the composition, and are known by those skilled in the art.

As contemplated herein, the compositions of the present invention may comprise a metabolizable energy content of from about 3500 to about 4500 kcal/kg. As referred to herein, "metabolizable energy" is the energy available to an animal upon consumption of the diet (or composition) after subtracting the energy excreted in feces, urine, and combustible gases. Metabolizable energy values may be determined following the protocols established by methods known by those of skill in the art, e.g., according to official guidelines produced by the Association of American Feed Control Officials (AAFCO).

By way of example, but without limitation, it is contemplated herein that a highly digestible composition of the present invention which results in reduced stool volume and stool malodor may comprise: 36% brewers rice, 16% egg, 16% corn starch, 14.5% corn gluten meal, 2.5% beet pulp, 2.5% soybean oil, 2% flaxseed, carnitine, one or more amino acids, minerals and vitamins and one or more palatability enhancers. Specifically, said composition displays ≥88.0% dry matter, true protein, fat, carbohydrate, and energy digestibility.

While compositions of any consistency or moisture content are contemplated, preferably the compositions of the present invention may be, for example, a wet, semi-moist, or dry animal food composition. "Wet" food refers to food that has a moisture content of from about 70 to 90%. "Semi-moist" food refers to food that has a moisture content of from about 15% to 40%. "Dry" food refers to compositions from about 5% to 15% moisture content and is often manufactured in the form of small bits or kibbles. Also contemplated herein are compositions that may comprise components of various consistency as well as components that may include more than one consistency, for example, soft, chewy meat-like particles as well as kibble having an outer cereal component and an inner cream component as described in, e.g., U.S. Pat. No. 6,517,877. The kibble may then be dried and optionally coated with one or more topical coatings known by those skilled in the art, for example, flavors, fats, oils, powders, and the like. The compositions of the present invention can be prepared using conventional manufacturing methods.

It is contemplated that the invention described herein is not limited to the particular methodology, protocols, and reagents described as these may vary. It is also to be understood that the terminology used herein is for the purpose of describing particular embodiments only, and is not intended to limit the scope of the present invention in any way. Further, the detailed description of embodiments is intended only to acquaint others skilled in the art with the invention, its principles, and its practical application so that others skilled in the art may adapt and apply the invention in its numerous forms, as they may be best suited to the requirements of a particular use. This invention, therefore, is not limited to the embodiments described herein, and may be variously modified.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entirety for all purposes.

Example 1

The foods of Table 1 are formulated and formed as kibbles in accordance with the Association of American Feed Control Officials 2005 *Nutrient Guide for Dogs*, balanced to meet adult maintenance requirements and extruded as a dry kibble according to conventional methods. Both compositions are formulated to meet or exceed AAFCO nutrient recommendations. Metabolizable energy is calculated according to conventional methods, e.g., using the Atwater equation, and percentages are expressed on a dry matter basis. The five most abundant ingredients (in decreasing order) are also provided:

TABLE 1

Nutrient Analysis and Top Five Ingredients of Control A and Test Composition B

|  | Control A | Test Composition B |
|---|---|---|
| Analyzed nutrient (dry matter basis) |  |  |
| Crude protein % | 25 | 24 |
| Crude fat % | 15.5 | 12.2 |
| Calcium % | 0.74 | 0.77 |
| Phosphorus % | 0.67 | 0.5 |
| Crude fiber % | 2.2 | 1.1 |
| Metabolizable Energy (kcal/kg) | 4035 | 3900 |
| Lysine, % | 1.14 | 1.37 |
| Lysine:calorie | 2.8 | 3.5 |
| Ingredient |  |  |
| 1 | Corn | Rice |
| 2 | Milo | Egg |
| 3 | Wheat | Corn Starch |
| 4 | Ground chicken | Corn gluten meal |
| 5 | Poultry Meal | Beet pulp |

Example 2

A digestibility study is performed to determine the digestibility of the control and test foods of Example 1. Two sets of five dogs over the course of 14 days are fed the compositions of Example 1. One set of five dogs is fed Control A, and the second set of five dogs is fed Test Composition B for seven days. Following seven days, the food for the animals is exchanged. Days 1 and 2 are allowed for adaptation to the food, and on days 3 to 7 total stool amounts are collected and analyzed. On day eight, each group is fed the second food, the first two days allowing for adaptation to the new food, and stool samples are collected daily and analyzed for the remainder of the study. Feces are collected throughout the day and placed in sealable plastic bags (24 hr or before cage washing the following morning). Bags are labeled with animal ID #, date and test #. Any fecal sample needing storage is refrigerated at 5° C. Fecal volume is measured using a displacement method. The stool sample is weighed and then added at the top of a stool densitometer. The displaced water is collected and the volume measured in a graduated cylinder. The density measurement (g/cc) is the following calculation: the weight of the sample (grams) divided by the volume (mL) of the displaced water. Data are analyzed using the General Linear Models procedure of SAS to determine treatment means. All digestibility assays are performed according to conventional methods. Digestibility values, and stool characteristics are provided in Table 2.

TABLE 2

Results of Digestibility Study Comparing Control A with Test Composition B

| Test Result | Control A | Test Composition B |
|---|---|---|
| Dry matter digestibility % | 86.2 | 89.5 |
| True Protein digestibility % | 89.2 | 93.8 |
| Fat digestibility % | 94.5 | 94.2 |
| Carbohydrate digestibility % | 95.5 | 96.0 |
| Energy digestibility % | 88.6 | 92.4 |
| Stool quantity (g/day) | 119.2 | 87.8 |
| Average stool weight (g) | 95.3 | 64.0 |
| Average stool volume (ml) | 89.8 | 63.1 |
| Average Stool Density (g/ml) | 1.06 | 1.01 |
| Average daily food intake (g) | 300 | 298 |

The results indicate that animals fed Test Composition B produce less stool (in terms of stool weight and volume) compared to dogs fed Control A.

Example 3

Test Composition C is formulated in accordance with the Association of American Feed Control Officials 2005 *Nutrient Guide for Dogs*, balanced to meet adult maintenance requirements, and extruded as a dry kibble according to conventional methods. Metabolizable energy content is calculated with the Atwater equation. The four most abundant ingredients are rice, egg, corn starch, and corn gluten meal. The contents of Test Composition C are analyzed by methods known in the art, and are presented below on a dry matter basis.

TABLE 3

Analyzed Nutrients of Test Composition C

| Nutrient | Test Composition C |
|---|---|
| Crude Protein, % | 25.1 |
| Crude Fat, % | 13.8 |
| Calcium, % | 0.64 |
| Ash % | 5.1 |
| Phosphorous, % | 0.62 |
| Crude Fiber, % | 0.90 |
| NFE % | 55.1 |
| Total Dietary Fiber, % | 4.65 |
| Metabolizable Energy, kcal/kg | 3978 |

Example 4

A digestibility study is performed to compare Test Composition C of Example 3 with a commercially available dog food (Eukanuba® Adult Maintenance Small Bites ("EU-SB")). Metabolizable energy content is calculated with the Atwater equation. The four most abundant ingredients of EU-SB are chicken, chicken-by-product meal, corn meal, and ground whole grain sorghum. The composition of EU-SB is analyzed by methods known in the art, and is provided in Table 4 along with the nutrient analysis of Test Composition C. The results of the digestibility study are presented in Table 5.

The digestibility study is performed as described in Example 2. In this case, two sets of five dogs over the course of 14 days are fed either Test Composition C or EU-SB. One set of five dogs are fed Composition C, and the second set of five dogs are fed EU-SB for seven days. Following seven days, the foods for the animals are exchanged. Days 1 and 2 are allowed for adaptation to the food, and on days 3 to 7 total stool amounts are collected. On day eight, each group is fed the second food, the first two days allowing for adaptation to the new food. Stool samples are collected daily and analyzed for the remainder of the study as described in Example 2. With regard to each 7 day test period, the first 3 day stool collection is used for measurement of stool volume, weight and density. These three stool measurements are assessed daily and a three day average is computed. Additionally in this study, the last two days of the stool collection are used for measurement of fecal odor. A two day composite is used for the fecal odor measurement (see Example 5 below). A study schedule is provided below:

| Study Day | Procedure | Measurement |
|---|---|---|
| Days 0-7 | 5 animals receive Control Food, 5 animals receive Test Food | Food Intake & Fecal Score-daily Body Weight -weekly |
| Day 3-5 | Fecal collection | Fecal volume, weight & density |
| Day 6-7 | Fecal collection | Fecal odor |
| Days 8-14 | Animals switch diet; 5 on control, 5 on test | Food Intake & Fecal Score-daily |
| Day 10-12 | Fecal collection | Fecal volume, weight & density |
| Day 13-14 | Fecal collection | Fecal odor |

TABLE 4

Analyzed Nutrients of Food Compositions

| Nutrient (on dry matter basis) | Test Composition C | EU-SB |
|---|---|---|
| Crude Protein % | 25.1 | 26.5 |
| Crude Fat % | 13.8 | 18.2 |
| Ash % | 5.1 | 7.7 |
| Calcium % | 0.64 | 1.35 |
| Phosphorous % | 0.62 | 1.07 |
| Crude Fiber % | 0.90 | 2.35 |
| NFE % | 55.1 | 45.2 |
| Total Dietary Fiber % | 4.65 | 9.74 |
| Metabolizable Energy (kcal/kg) | 3978 | 4058 |

TABLE 5

Results of Digestibility Study Comparing Test Composition C and EU-SB

| Test Result | Test Composition C | EU-SB |
|---|---|---|
| Dry Matter Digestibility % | 91.0 | 84.9$^a$ |
| True Protein Digestibility % | 98.2 | 89.9$^a$ |
| Fat Digestibility % | 94.3 | 95.5$^a$ |
| Carbohydrate Digestibility % | 96.7 | 95.9 |
| Energy Digestibility % | 92.7 | 89.1$^a$ |
| Stool volume (ml) | 54.7 | 90.1 |
| Stool weight (g) | 57.4 | 95.6 |
| Stool density (g/cc) | 0.99 | 1.05 |

$^a$ $P < 0.05$
$^b$ $P < 0.10$

The results indicate that when Test Composition C is fed to dogs, the dogs produce less stool weight and volume than dogs fed commercial food EU-SB.

Example 5

Fecal odor analyses are performed with the stools collected from the digestibility study described in Example 4. All fecal samples are kept refrigerated at 5° C. prior to analysis. The samples are removed from refrigeration and composited by animal as needed into polyethylene bags. The samples are then kneaded in the bag to break up and mix the fecal material. Fecal material is then loaded into a 10 mL polyethylene syringe and 5 g (+/−0.01 g) is expressed into a 20 mL headspace vial and crimp capped for analysis. Expression from the syringe serves to increase the surface area of the sample. This is critical for adequate equilibration of the volatile components in the stool samples. Sample preparation in this manner also serves to "normalize" the form of the samples in the headspace vial.

The samples are then loaded onto a Leap Technologies Combi-PAL sampler. The sampler took each sample, in turn, and incubated them at 30° C. and then sampled using a Solid Phase Microextraction (SPME) fiber (Supelco, 1 cm×75 μm Carboxen/PDMS). The fiber is exposed to the headspace in the vial for 30 min and then injected onto an Agilent 6890 Gas Chromatograph/5973N Mass Selective Detector (GCMS). The separation is done on an Agilent DB-WAXETR column (60 m×0.25 mm×0.25 μm). When the analysis is complete, the data is processed to measure the peak area for an ion (the QIon) unique to each compound.

A summary report of all the peak areas is exported into a database where each compound is categorized by its primary functional group. The peak areas of all compounds in each category are totaled. These totals are then analyzed using the SAS pairwise comparisons Proc mixed procedure.

Stool aroma evaluations are made on study days 6, 7, 13, and 14 using the following procedures: fresh stool samples are collected and placed in plastic bags that have been randomly coded with 3-digit numbers. Eleven animal colony staff members are recruited to evaluate the samples. Samples are evaluated within 1 hour of collection. Samples are given, one at a time, to each participant in random order. Participants evaluate the samples by holding the open bag approximately 1 foot from their nose and smell the aroma using several "bunny sniffs". Participants assign an aroma strength rating to each sample using a 5-point scale where 1=no aroma at all and 5=extremely strong aroma. Aroma strength ratings are recorded on forms provided. At the end of the study, means for each sample are calculated and compared using the general linear model (GLM) procedure of SAS. Results of the fecal analyses are provided below in Tables 6-14.

TABLE 6

Fecal Stool Scores

EU-SB

Intake Data:

|  | Mean | StDev | Min | Max | Count |
|---|---|---|---|---|---|
| Food Intake | 223.5 | 33.9 | 129 | 303 | 95 |
| Stool | 4.9 | .3 | 4 | 5 | 97 |

Stool Frequency Data:

| Stool Rating | 1 | 2 | 3 | 4 | 5 |
|---|---|---|---|---|---|
| Count | 0 | 0 | 0 | 10 | 87 |
| Percent | 0.0 | 0.0 | 0.0 | 10.3 | 89.7 |

TABLE 6-continued

Fecal Stool Scores

Test Composition C

Intake Data:

| | Mean | StDev | Min | Max | Count |
|---|---|---|---|---|---|
| Food Intake | 213.3 | 30.4 | 157 | 277 | 95 |
| Stool | 4.9 | .4 | 2 | 5 | 93 |

Stool Frequency Data:

| Stool Rating | 1 | 2 | 3 | 4 | 5 |
|---|---|---|---|---|---|
| Count | 0 | 1 | 1 | 5 | 86 |
| Percent | 0.0 | 1.1 | 1.1 | 5.4 | 92.5 |

EU-SB

Intake Data:

| | Mean | StDev | Min | Max | Count |
|---|---|---|---|---|---|
| Food Intake | 181.3 | 41.1 | 124 | 275 | 70 |
| Stool | 4.3 | .7 | 2 | 5 | 101 |

Stool Frequency Data:

| Stool Rating | 1 | 2 | 3 | 4 | 5 |
|---|---|---|---|---|---|
| Count | 0 | 2 | 10 | 41 | 48 |
| Percent | 0.0 | 2.0 | 9.9 | 40.6 | 47.5 |

Test Composition C

Intake Data:

| | Mean | StDev | Min | Max | Count |
|---|---|---|---|---|---|
| Food Intake | 181.3 | 41.6 | 123 | 277 | 70 |
| Stool | 4.4 | .7 | 2 | 5 | 79 |

Stool Frequency Data:

| Stool Rating | 1 | 2 | 3 | 4 | 5 |
|---|---|---|---|---|---|
| Count | 0 | 2 | 6 | 29 | 42 |
| Percent | 0.0 | 2.5 | 7.6 | 36.7 | 53.2 |

TABLE 7

Average Fecal Volume, Weight and Density

| | Fecal Weight (grams) | Fecal Volume (mL) | Fecal Density (g/cc) |
|---|---|---|---|
| EU-SB | 95.60 | 90.10 | 1.05 |
| Test Comp. C | 57.40 | 54.70 | 0.99 |
| P-value | <0.01 | <0.01 | 0.03 |
| % Difference | −39.96% | −39.29% | −5.71% |

TABLE 8

Fecal Odor: Comparison of Peak Area Totals for Classes of Headspace Volatiles from Canine Stools for Dogs on Test Composition C and EU-SB - Based on Overall Feeding - (Statistics using Pairwise Comparisons by Proc Mixed) - Test 1

| | Test Composition C | EU-SB | Probability of > \|t\| |
|---|---|---|---|
| Acids | 20210973 | 38915911 | 0.177 |
| Alcohols | 14099355 | 14946040 | 0.849 |
| Ketones | 14278852 | 11038781 | 0.167 |

TABLE 8-continued

Fecal Odor: Comparison of Peak Area Totals for Classes of Headspace Volatiles from Canine Stools for Dogs on Test Composition C and EU-SB - Based on Overall Feeding - (Statistics using Pairwise Comparisons by Proc Mixed) - Test 1

| | Test Composition C | EU-SB | Probability of > \|t\| |
|---|---|---|---|
| Aldehydes | 793065 | 723638 | 0.654 |
| Sulfur-Containing* | 2578798 | 7415707 | 0.084 |
| Heterocyclics* | 6164309 | 3963024 | 0.070 |
| Furans # | 1109634 | 587942 | 0.017 |
| Esters | 11642111 | 16152892 | 0.244 |
| Indole | 4542689 | 3017321 | 0.141 |
| Phenol* | 3748062 | 2047024 | 0.094 |

Peak areas are significantly different at the 95% confidence level
*Peak areas are significantly different at the 90% confidence level Peak areas are adjusted for sample weights

TABLE 9

Fecal Odor: Comparison of Peak Area Totals for Classes of Headspace Volatiles from Canine Stools for Dogs on Test Composition C and EU-SB - Based on Overall Feeding - (Statistics using Pairwise Comparisons by Proc Mixed) - Test 2

| | Test Composition C | EU-SB | Probability of > \|t\| |
|---|---|---|---|
| Acids* | 27576089 | 54175201 | 0.0211 |
| Alcohols# | 9834550 | 7401144 | 0.0987 |
| Aldehydes* | 686314 | 171381 | 0.0020 |
| Esters | 10082059 | 12901126 | 0.2351 |
| Furans | 783506 | 624359 | 0.3247 |
| Heterocyclics* | 3490767 | 2120497 | 0.0153 |
| Hydrocarbons* | 165010 | 328482 | 0.0046 |
| Indole* | 3147117 | 1829258 | 0.0200 |
| Ketones | 11546838 | 15886302 | 0.5580 |
| Phenol* | 2484498 | 1253450 | 0.0334 |
| Sugar Related* | 769426 | 4875788 | 0.0079 |
| Sulfur Compounds | 1073366 | 2497176 | 0.3220 |

*Peak areas are significantly different at the 95% confidence level
Peak areas are significantly different at the 90% confidence level Peak areas are adjusted for sample weights

TABLE 10

Comparison of Peak Area Totals between Studies (Tests 1 and 2); Directional Changes in Peak Area for Test Composition C vs EU-SB

| | Test 1 | Test 2 |
|---|---|---|
| Acids | ↓ | ↓ |
| Alcohols | ↓ | ↑ |
| Aldehydes | ↑ | ↑ |
| Esters | ↓ | ↓ |
| Furans | ↑ | ↑ |
| Heterocyclics | ↑ | ↑ |
| Indole | ↑ | ↑ |
| Ketones | ↑ | ↓ |
| Phenol | ↑ | ↑ |
| Sulfur Compounds | ↓ | ↓ |

TABLE 11

Fecal Odor: Comparison of Peak Area Totals for Classes of Headspace Volatiles from Canine Stools for Dogs on Test Composition C and EU-SB - Based on Overall Feeding - (Statistics using Pairwise Comparisons by Proc Mixed) - Test 1 and Tests 2 Combined

| | Test Composition C | EU-SB | Probability of > \|t\| |
|---|---|---|---|
| Acids* | 23893531 | 46545556 | 0.0102 |
| Alcohols | 11966953 | 11173592 | 0.6598 |

TABLE 11-continued

Fecal Odor: Comparison of Peak Area Totals for Classes of Headspace Volatiles from Canine Stools for Dogs on Test Composition C and EU-SB - Based on Overall Feeding - (Statistics using Pairwise Comparisons by Proc Mixed) - Test 1 and Tests 2 Combined

|  | Test Composition C | EU-SB | Probability of > \|t\| |
|---|---|---|---|
| Aldehydes# | 739690 | 447510 | 0.0745 |
| Esters# | 10862085 | 14527009 | 0.0905 |
| Furans* | 946570 | 606151 | 0.0264 |
| Heterocyclics# | 4827538 | 3041761 | 0.0525 |
| Indole* | 3844903 | 2423290 | 0.0455 |
| Ketones | 12912845 | 13462542 | 0.8854 |
| Phenol* | 3116280 | 1650237 | 0.0456 |
| Sulfur Compounds* | 1826082 | 4956442 | 0.0490 |

*Peak areas are significantly different at the 95% confidence level

Peak areas are significantly different at the 90% confidence level Peak areas are adjusted for sample weights

TABLE 12

Fecal Sensory Human Assessment: Aroma Strength Scores for Dogs Fed Dry Test Composition D and EU-SB - Total Test (Test 2)

|  | Test Composition C | EU-SB |
|---|---|---|
| Aroma Strength | 2.92$^a$ | 3.19$^b$ |
| Distribution of Odor Scores | | |
| 1 = No Aroma at All | 7% | 1% |
| 2 = Slight Aroma | 31% | 23% |
| 3 = Moderate Aroma | 32% | 39% |
| 4 = Strong Aroma | 18% | 24% |
| 5 = Extremely Strong Aroma | 10% | 11% |

$^a$Means followed by the same letter followed by the same letter are not significant at the 95% confidence level

TABLE 13

Fecal Sensory Human Assessment: Aroma Strength Scores for Dogs Fed Test Composition C and EU-SB - Grouped by Feeding Group (Test 2)

| | Group 1 | | Group 2 | |
|---|---|---|---|---|
| | Feeding Sequence | | | |
| | EU-SB First - Test Composition C Last | | Test Composition C First - EU-SB Last | |
| Food | Test Comp. C | EU-SB | Test Comp. C | EU-SB |
| Aroma Strength | 2.74$^a$ | 3.28$^b$ | 3.11$^a$ | 3.10$^a$ |
| Distribution of Odor Scores | | | | |
| None | 9% | 1% | 5% | 1% |
| Slight | 37% | 21% | 25% | 24% |
| Moderate | 32% | 37% | 32% | 42% |
| Strong | 11% | 24% | 25% | 23% |
| Extreme | 7% | 14% | 11% | 7% |

$^a$Means followed by the same letter within a group that are followed by the same letter are not significant at the 95% confidence level

TABLE 14

Fecal Sensory Human Assessment: Aroma Strength Scores for Dogs Fed Test Composition C and EU-SB-Grouped by Feeding Sequence (Test 2)

| Feeding Sequence | Group 1 EU-SB First - Test Composition C Last | | | | Group 2 Test Composition C - First EU-SB Last | | | |
|---|---|---|---|---|---|---|---|---|
| Date | 3/1 | 2/22 | 3/2 | 2/23 | 2/22 | 3/1 | 2/23 | 3/2 |
| Food | Test | EU-SB | Test | EU-SB | Test | EU-SB | Test | EU-SB |
| Aroma Strength | 2.73$^a$ | 3.33$^b$ | 2.76$^a$ | 3.24$^b$ | 2.98$^a$ | 3.02$^a$ | 3.24$^a$ | 3.20$^a$ |
| Distribution of Odor Scores | | | | | | | | |
| None | 12% | 1% | 6% | 1% | 9% | 3% | 1% | — |
| Slight | 34% | 14% | 40% | 29% | 25% | 27% | 25% | 21% |
| Moderate | 32% | 45% | 32% | 29% | 30% | 40% | 30% | 45% |
| Strong | 7% | 25% | 16% | 23% | 27% | 21% | 27% | 25% |
| Extreme | 12% | 12% | 6% | 16% | 7% | 7% | 7% | 7% |

$^a$Means followed by the same letter within a comparison that are followed by the same letter are not significant at the 95% confidence level Data presented in the tables above indicate that fecal stool scores are not different between Test Composition C and EU-SB (e.g., 4.9 for both diets in Test 1; 4.3 vs 4.4 for EU-SB and Test Composition C, respectively in Test 2).

Fecal stool weights and volumes are statistically different between Test Composition C and EU-SB product. In both studies (Test 1 and Test 2), dogs fed the test diet have significantly lower stool weight (57.4 vs 95.6 g, respectively) and lower stool volume (54.7 vs 90.1 mL, respectively) compared to dogs fed the EU-SB product. Fecal density is not different (0.99 vs 1.05 g/cc). Numbers shown are an average from the two studies.

Fecal odor is assessed using headspace analysis of the stool aroma. Results from the combined studies show that dogs fed the test diet produce 63% lower levels of sulfur-containing compounds compared to dogs fed the EU-SB product (P<0.05). This is an important finding because sulfur compounds have a very low odor threshold, thus a reduction in these compounds should result in an improvement in stool odor. Dogs fed the test diet also have significantly lower levels of acids (e.g., 49% reduction; (P<0.05)). Dogs fed the EU-SB diet (numbers shown are from the combined study) have significantly lower levels of phenols (P<0.05), indoles (P<0.05), and furans (P<0.05).

A sensory panel composed of 11 participants is used to rank stool odor strength in stool samples collected from the study 2 stool samples. These analyses show that dogs fed the test diet had a lower fecal odor score compared to dogs fed the EU-SB product (2.92 vs 3.19; P<0.05). Thus, viewing the results as a whole (e.g., the headspace analyses along with the results from the sensory analyses) suggests that reductions in sulfur and possibly acid compounds may be more important than reductions in some of the other compounds (e.g., furans, phenols, and indoles).

The Test Composition C dog diet is shown to be very highly digestible. Digestibility of dry matter, true protein and energy is 91.0, 98.2 and 92.7%, respectively. Not only does the increased digestibility reduce stool weight and volume, but fecal odor (as assessed by both analytical and sensory tests) is also reduced.

We claim:

1. A highly digestible pet food composition comprising
high quality protein wherein the high quality protein has a true protein digestibility of greater than about 90% and
highly digestible carbohydrate, wherein the highly digestible carbohydrate has a digestibility of greater than about 90%;
wherein said pet food composition has a dry matter digestibility greater than about 88% and a metabolizable energy content of from about 3500 to 4000 kcal/kg, and
wherein said high quality protein is non-hydrolyzed.

2. The pet food of claim 1 comprising from about 15% to 30% high quality protein source.

3. The pet food of claim 1 comprising from about 25% to 50% highly digestible carbohydrate.

4. The pet food of claim 1 comprising from about 3% to 6% total dietary fiber.

5. The pet food of claim 1 comprising from about 11% to 16% fat.

6. The pet food of claim 1 wherein said highly digestible carbohydrate has a digestibility of greater than about 90%.

7. The pet food of claim 1 wherein said high quality protein is chosen from meat, meat-by-product, seafood, dairy products, egg and mixtures thereof.

8. The pet food of claim 1 wherein said highly digestible carbohydrate is chosen from corn, wheat, distiller's dried grain, corn starch, rice, corn gluten meal, and mixtures thereof.

9. The pet food of claim 1 comprising a mineral chosen from sodium, potassium, magnesium, manganese, calcium, chloride, copper, zinc, choline, iron, phosphorus, iodine and selenium.

10. The pet food of claim 1 comprising a vitamin chosen from vitamin A, vitamin B1, vitamin B2, vitamin B6, vitamin B12, vitamin C, vitamin D, vitamin E, vitamin H, vitamin K, folic acid, inositol, niacin, and pantothenic acid.

11. The pet food of claim 1 comprising carnitine.

12. The pet food of claim 1 comprising an amino acid chosen from phenylalanine, leucine, methionine, lysine, isoleucine, valine, threonine, tryptophan, histidine and arginine.

13. The pet food of claim 1 wherein said pet food is a dry pet food.

14. The pet food of claim 1 wherein said pet food is a wet pet food.

15. The pet food of claim 1 wherein said pet food is a nutritionally complete pet food.

16. The pet food of claim 1 wherein said pet food is a dog food.

17. A highly digestible pet food composition comprising:
(a) about 36% brewer's rice;
(b) about 16% egg;
(c) about 16% corn starch;
(d) about 14.5% corn gluten meal;
(e) about 2.5% beet pulp;
(f) about 2.5% soybean oil;
(g) about 2.0% flaxseed;
(h) carnitine; and
(i) high quality protein wherein the high quality protein has a true protein digestibility of greater than about 90% and
wherein said pet food composition has a dry matter digestibility greater than about 88% and a metabolizable energy content of from about 3500 to 4000 kcal/kg, and
wherein said high quality protein is non-hydrolyzed.

18. The pet food of claim 17 wherein said pet food is a dry pet food.

19. The pet food of claim 17 wherein said pet food is a wet pet food.

20. The pet food of claim 17 wherein said pet food is a nutritionally complete pet food.

21. The pet food of claim 17 wherein said pet food is a dog food.

22. The pet food of claim 17 having greater than about 88% dry matter digestibility by a canine.

23. The pet food of claim 17 wherein said pet food has a carbohydrate digestibility of greater than about 90%.

24. A method for reducing the volume of stool produced by an animal comprising feeding the animal the pet food composition of claim 1 or claim 17.

25. A method for reducing the amount of sulfur containing compounds in stool and thereby reducing the odor of stool produced by an animal comprising feeding the animal the pet food composition of claim 1 or claim 17.

26. The food composition of claim 1 comprising
from about 15% to 30% high quality protein source,
from about 25% to 50% highly digestible carbohydrate,
from about 3% to 6% total dietary fiber, and
from about 11% to 16% fat.

* * * * *